United States Patent
Bresky et al.

(10) Patent No.: US 10,202,009 B2
(45) Date of Patent: Feb. 12, 2019

(54) TRAILER HITCH ARCHITECTURE ADAPTABLE TO MULTIPLE CONVENTIONAL DRAWBAR SIZES HAVING DRAWBAR ADAPTOR SIZE-REDUCING SLEEVE FOR ATTACHMENT PIN

(71) Applicant: Ford Global Technologies, LLC, Dearborn, MI (US)

(72) Inventors: Aaron Anthony Bresky, St. Clair Shores, MI (US); Douglas Lee Howe, Grosse Ile, MI (US); Daniel J. McCarthy, Northville, MI (US); Chih Yu Lin, Canton, MI (US); Andre Kunynetz, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 15/212,382

(22) Filed: Jul. 18, 2016

(65) Prior Publication Data

US 2018/0015796 A1 Jan. 18, 2018

(51) Int. Cl.
*B60D 1/00* (2006.01)
*B60D 1/155* (2006.01)
(Continued)

(52) U.S. Cl.
CPC .............. *B60D 1/155* (2013.01); *B60D 1/06* (2013.01); *B60D 1/075* (2013.01); *B60D 1/58* (2013.01)

(58) Field of Classification Search
CPC .................................. B60D 1/155; B60D 1/06
(Continued)

(56) References Cited

U.S. PATENT DOCUMENTS 5,380,030 A * 1/1995 Gullickson .............. B60D 1/30
267/138
5,845,921 A 12/1998 Stimac
(Continued)

FOREIGN PATENT DOCUMENTS

CA 2512381 A1 12/2007

OTHER PUBLICATIONS http://www.amazon.com/Trimax-TS32-Universal-Receiver-Lock/dp/B000OCBO1S, Trimax TS32 Universal Receiver Lock—Fits 1/2" and 5/8" with Stainless Steel Sleeve, Mar. 5, 2016.

*Primary Examiner* — Jacob D Knutson
(74) *Attorney, Agent, or Firm* — LeClairRyan

(57) ABSTRACT

The disclosed inventive concept provides a trailer hitch arrangement for use with a drawbar that is adaptable to universally use a high strength conventional hitch pin. Particularly, a reducing pin sleeve is fitted into the hitch pin hole of the drawbar. The inner diameter of the reducing pin sleeve is less than the hitch pin hole conventionally formed in the drawbar while the inner diameter of the reducing pin sleeve is the same as that of the receiver. When the drawbar is fitted into the receiver, the reducing pin sleeve is captured therein, thus preventing side-to-side movement relative to the drawbar. The disclosed inventive concept allows vehicle owners having a standard 3" receiver trailer hitch which conventionally includes a ⅝" hitch pin hole to safely and effectively handle above 20,000 lbs. trailer rating by insertion of the hitch pin sleeve into the ¾" hitch pin hole provided in the drawbar.

18 Claims, 9 Drawing Sheets

(51) Int. Cl.
*B60D 1/06* (2006.01)
*B60D 1/07* (2006.01)
*B60D 1/58* (2006.01)

(58) Field of Classification Search
USPC .......................................................... 280/515
See application file for complete search history.

(56) References Cited

U.S. PATENT DOCUMENTS

| | | | | |
|---|---|---|---|---|
| 6,672,115 | B2 * | 1/2004 | Wyers | B60D 1/52 |
| | | | | 280/506 |
| 6,834,879 | B1 * | 12/2004 | Lorman | B60D 1/06 |
| | | | | 280/483 |
| 7,338,064 | B1 * | 3/2008 | Williams | B60D 1/54 |
| | | | | 280/491.1 |
| 7,338,065 | B1 * | 3/2008 | Clausen | B60D 1/241 |
| | | | | 280/505 |
| 7,600,774 | B1 * | 10/2009 | Speer | B60D 1/155 |
| | | | | 280/493 |
| 7,717,455 | B2 | 5/2010 | Morris | |
| 7,806,425 | B2 * | 10/2010 | Chang | B60D 1/241 |
| | | | | 280/506 |
| 8,210,560 | B2 | 7/2012 | Shaw | |
| 8,585,073 | B2 * | 11/2013 | Smoot | B60D 1/025 |
| | | | | 280/491.5 |
| 9,090,136 | B2 | 7/2015 | Breeden et al. | |
| 2013/0080078 | A1 * | 3/2013 | Wirthlin | G01L 1/2243 |
| | | | | 702/42 |
| 2013/0193670 | A1 * | 8/2013 | Columbia | B60D 1/52 |
| | | | | 280/495 |

\* cited by examiner

TRAILER HITCH ARCHITECTURE ADAPTABLE TO MULTIPLE CONVENTIONAL DRAWBAR SIZES HAVING DRAWBAR ADAPTOR SIZE-REDUCING SLEEVE FOR ATTACHMENT PIN

TECHNICAL FIELD

The disclosed inventive concept relates to trailer hitches for vehicles. More particularly, the disclosed inventive concept relates to 3" trailer hitch architecture in which multiple step drawbar reducers, a high strength steel ⅝" steel pin having capacity markings, and a pin sleeve are provided. The hitch starts with a 3" size and uses multiple drawbar reducers to provide usage of 2" and 2½" drawbars. By having the pin sleeve in the 3" drawbar, drawbars of different sizes can be used with the same 3" hitch with a ⅝" pin hole and a high strength steel ⅝" pin without modifying the hitch.

BACKGROUND OF THE INVENTION

A wide variety of vehicles including automobiles, trucks, sport utility vehicles and recreational vehicles, are equipped with a trailer hitch arrangement. The trailer hitch is conventionally attached to or near (usually below) the vehicle's rear bumper. The conventional trailer hitch arrangement includes a trailer ball that can be coupled to a socket having a shape and size to receive the trailer ball. The socket is fitted to the trailer itself. The trailer ball is coupled to the socket and is secured in place by a locking arrangement.

Some trailer hitches are little more than a flat bar attached at one end to the vehicle and having the trailer ball attached at the other end. More sophisticated trailer hitch arrangements, that is, those designed generally for pulling larger loads include a receiver attached to the vehicle and a drawbar that can be inserted or removed from the receiver as desired. The trailer ball is attached to one end of the drawbar while the other end is inserted into the trailer hitch receiver. A hitch pin is inserted to hold the drawbar to the hitch receiver. A spring cotter pin holds the hitch pin in its position.

The towing industry presently uses two trailer hitch architectures for those hitches that utilize a receiver for a drawbar. For trailer ratings equal to or below 20,000 lbs., the largest drawbar is 2½" inches and utilizes a ⅝" hitch pin. For trailer ratings higher than 20,000 lbs., a 3" drawbar having a ¾" hitch pin is used. This latter application typically arises in the farming industry.

In the event that the operator elects to use a 2½" drawbar with a hitch rated higher than 20,000 lbs. capability (this combination being a standard 3" receiver with a ¾" hitch pin hole), a 3" to 2½" reducer sleeve is installed into the receiver. However, to accommodate the ¾" pin and the ¾" pin hole of the standard 3" receiver, users are required to enlarge the ⅝" pin hoe of the drawbar because most aftermarket ⅝" pins associated with 2½" hitch and drawbars are not rated higher than 20,000 lbs. But the ¾" hitch pin associated with the 3" hitch or drawbar is the only aftermarket pin rated higher than 20,000 lbs.

Accordingly, known approaches to modifying a hitch receiver to accommodate drawbars having reduced dimensions have not produced satisfactory results. As in so many areas of vehicle technology, there is always room for improvement related to trailer hitch systems for a vehicle.

SUMMARY OF THE INVENTION

The disclosed inventive concept provides a trailer hitch arrangement for use with a drawbar that is adaptable to universally use a ⅝" hitch pin. Particularly, the disclosed inventive concept provides a 3" receiver trailer hitch having a ¾" to ⅝" pin sleeve fitted into the drawbar, thereby allowing use of a high strength ⅝" hitch pin that is rated higher than 20,000 lbs.

According to the disclosed inventive concept, a reducing pin sleeve is fitted into the hitch pin hole of the drawbar. The inner diameter of the reducing pin sleeve is less than the hitch pin hole conventionally present in the 3" drawbar. However, the inner diameter of the reducing pin sleeve is the same as that of the receiver. Accordingly, when the drawbar is fitted into the receiver, the reducing pin sleeve is captured within the receiver, thus preventing side-to-side movement relative to the drawbar.

This arrangement provides users with two important advantages over known trailer hitch arrangements. First, for operators using either 2" or 2½" drawbars, these operators can continue to their existing drawbar having a ⅝" hitch pin hole with a conventionally installed trailer hitch assembly having a 3" to 2½" reducer, a 2½" to 2" reducer.

Second, for operators using a 3" drawbar having a ¾" hitch pin hole, these operators can insert the ¾" to ⅝" hitch pin reducer sleeve in the drawbar hole. This allows operators to use their existing 3" drawbar having a ¾" hitch pin hole on their 3" trailer hitch that is provided from the factory with a ⅝" hitch pin.

Accordingly, the disclosed inventive concept allows vehicle owners having a standard 3" receiver trailer hitch which includes a ⅝" hitch pin hole to safely and effectively handle above 20,000 lbs. trailer rating by insertion of the hitch pin sleeve into the ¾" hitch pin hole provided in the drawbar and a high strength ⅝" hitch pin.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
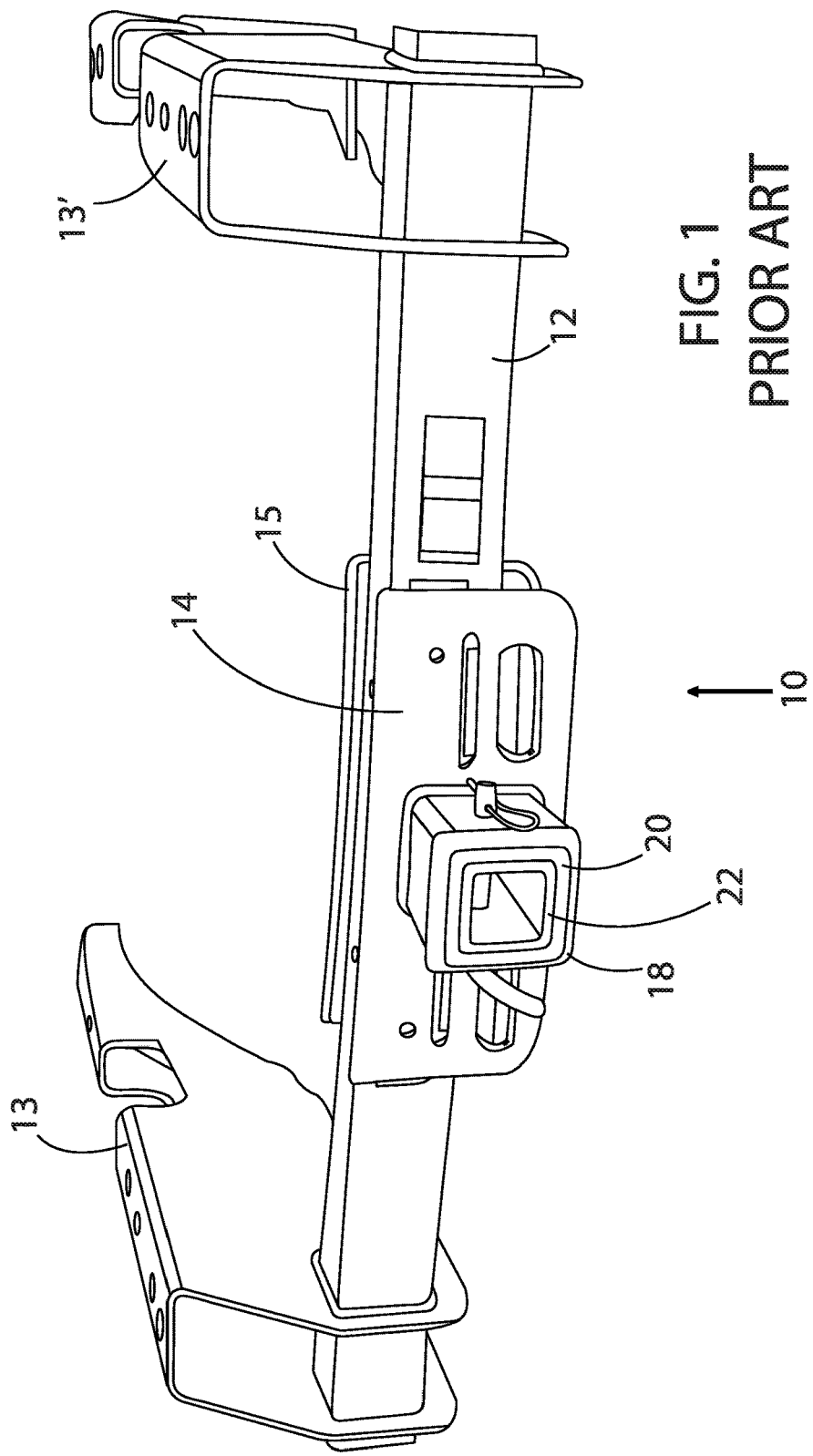
FIG. 1 is a front, right-side-up perspective view of a conventional trailer hitch in which a standard hitch receiver is used in conjunction with a first receiver reducer and a second receiver reducer, the standard hitch receiver including nested reducers fitted substantially within the base receiver.

In the following figures, the same reference numerals will be used to refer to the same components. In the following description, various operating parameters and components are described for different constructed embodiments. These specific parameters and components are included as examples and are not meant to be limiting.

Figure 2:
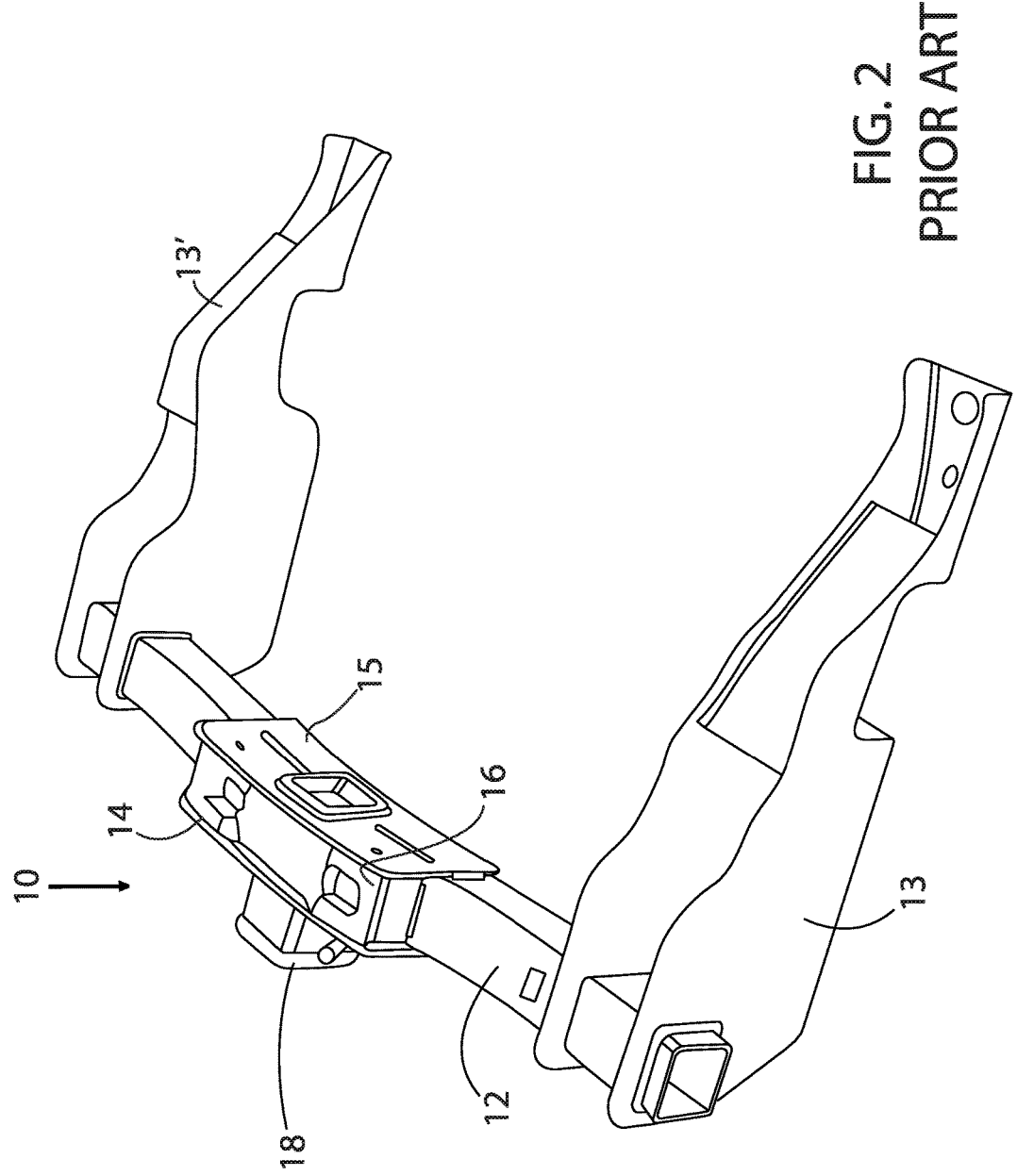
FIG. 2 is a back, top-side-down perspective view of the conventional trailer hitch illustrated in FIG. 1.
Figure 3:
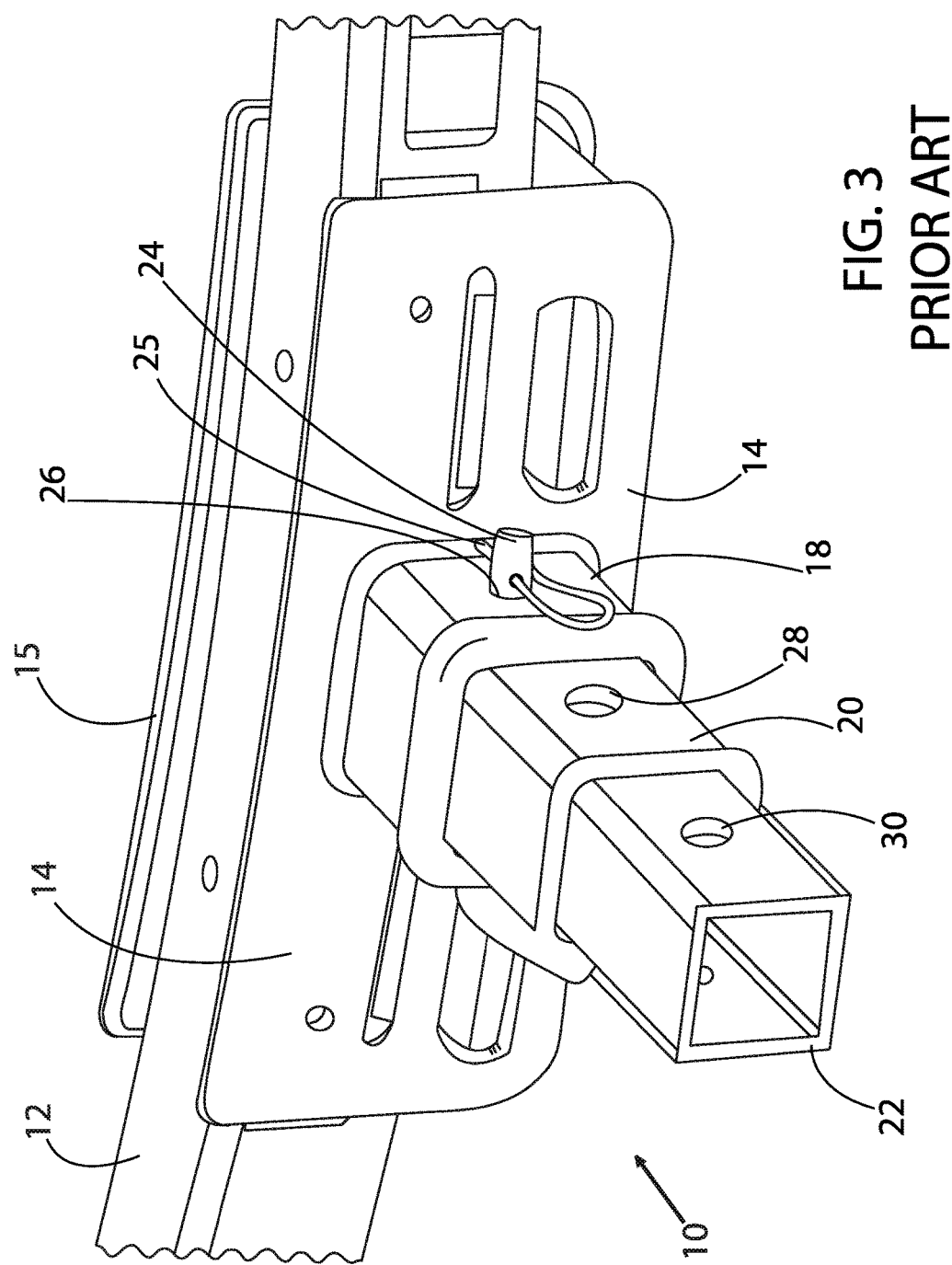
FIG. 3 is a front, right-side-up close-up perspective view of the conventional trailer hitch illustrated in FIGS. 1 and 2 but showing the trailer hitch assembly in close-up in which the inside reducer is positioned outward relative to the outside reducer which itself is positioned outward relative to the base receiver.
Figure 4:
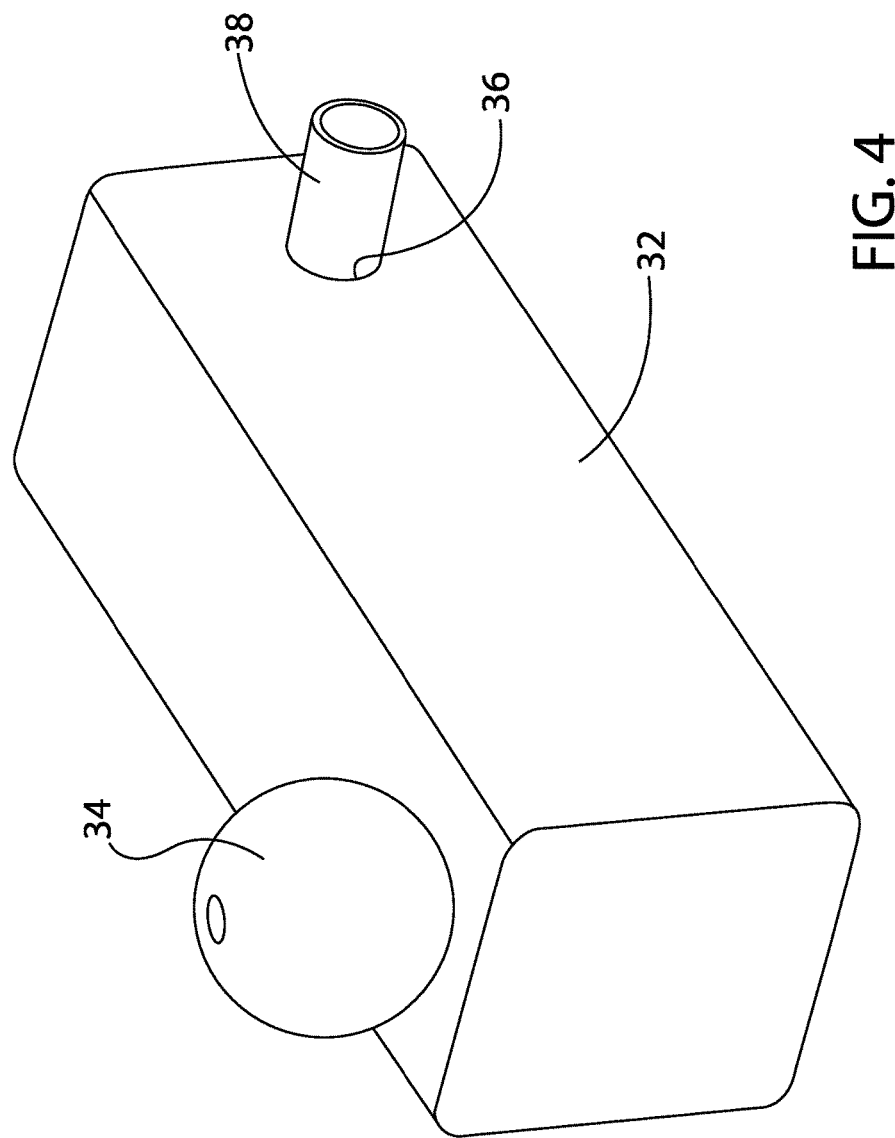
FIG. 4 is a perspective view of the drawbar-pin sleeve arrangement of the disclosed inventive concept showing the pin sleeve having been inserted partially into the pin hole formed in the drawbar according to the disclosed inventive concept.

The accompanying figures and the associated description illustrate the retention clip according to an embodiment of the disclosed inventive concept. In general, FIGS. 1 through 3 illustrate a trailer hitch receiver assembly according to the prior art. FIGS. 4 through 9 illustrate the drawbar used with a hitch pin reducing sleeve for use with a high strength 5/8" hitch pin according to the disclosed inventive concept.

Referring to FIG. 1, a perspective view of a trailer hitch receiver according to known arrangements is generally illustrated as 10. The hitch assembly 10 is attached to a trailer hitch cross-tube 12. The cross-tube 12 includes a pair of spaced apart side arms 13 and 13' which are attached to the frame of a vehicle (not shown). The trailer hitch receiver assembly 10 conventionally includes a front or chain plate 14, a back plate 15, and a lower plate 16 (shown in FIG. 2). The cross-tube 12 is captured between the front plate 14, the back plate 15 and the lower plate 16 as illustrated in FIGS. 1 through 3.

The trailer hitch receiver assembly 10 includes a base receiver 18. Typically the base receiver 18 has a 3" opening. A first reducer tube 20 is inserted into the base receiver 18. The first reducer tube 20 is removably provided to reduce the opening of the base receiver 18 from 3" to 2½". A second reducer tube 22 is removably provided to reduce the opening of the first reducer tube 20 from 2½" to 2". A standard 5/8" hitch pin 24 holds the first reducer tube 20 and the second reducer tube 22 in position within the base receiver 18. A hitch pin clip 25 locks the hitch pin 24 against movement out of its holding position.

The hitch pin 24 is fitted through a conventional 5/8" hitch pin hole 26 formed in the base receiver 18. The position of the first reducer tube 20 may be axially adjusted relative to the base receiver 18 by the provision of hitch pin holes such as hitch pin hole 28 formed in the first reducer tube 20. In the same way, the position of the second reducer tube 22 may be axially adjusted relative to the first reducer tube 20 by provision of hitch pin holes such as hitch pin hole 30 formed in the second reducer tube 22.

In the event that a vehicle operator wishes to use a drawbar (not shown) that is 2½" or smaller, the arrangement shown in FIG. 3 may be used. A conventional 5/8" hitch pin may be used.

However, in the event that a vehicle operator wishes to use a larger drawbar, an alternative arrangement is required, this arrangement being provided in a cost-effective and practical manner according to the disclosed inventive concept. Particularly, and with reference to FIGS. 4 and 5, a drawbar 32 is illustrated in perspective view. The drawbar 32 is of a conventional size and is thus typically 3". The drawbar 32 may be made of any hardened steel as is known in the art.

A trailer ball 34, typically of the interchangeable type, is attached to a first end of the drawbar 32. The second end of the drawbar 32 is inserted into the base receiver 18 and is held in place by a hitch pin for which a drawbar hitch pin hole 36 is provided. The hitch pin hole 36 of a 3" drawbar conventionally has an inner diameter of ¾". However, the hitch pin hole 25 of the conventional base receiver 18 (shown in FIG. 3) is of the 5/8" size.

To overcome the difference in sizes, a reducing pin sleeve 38 is positioned in the hitch pin hole 36. The reducing pin sleeve 38 has an inner diameter of 5/8" and an outer diameter of ¾", thus it is positionable within the hitch pin hole 36.

Figure 5:
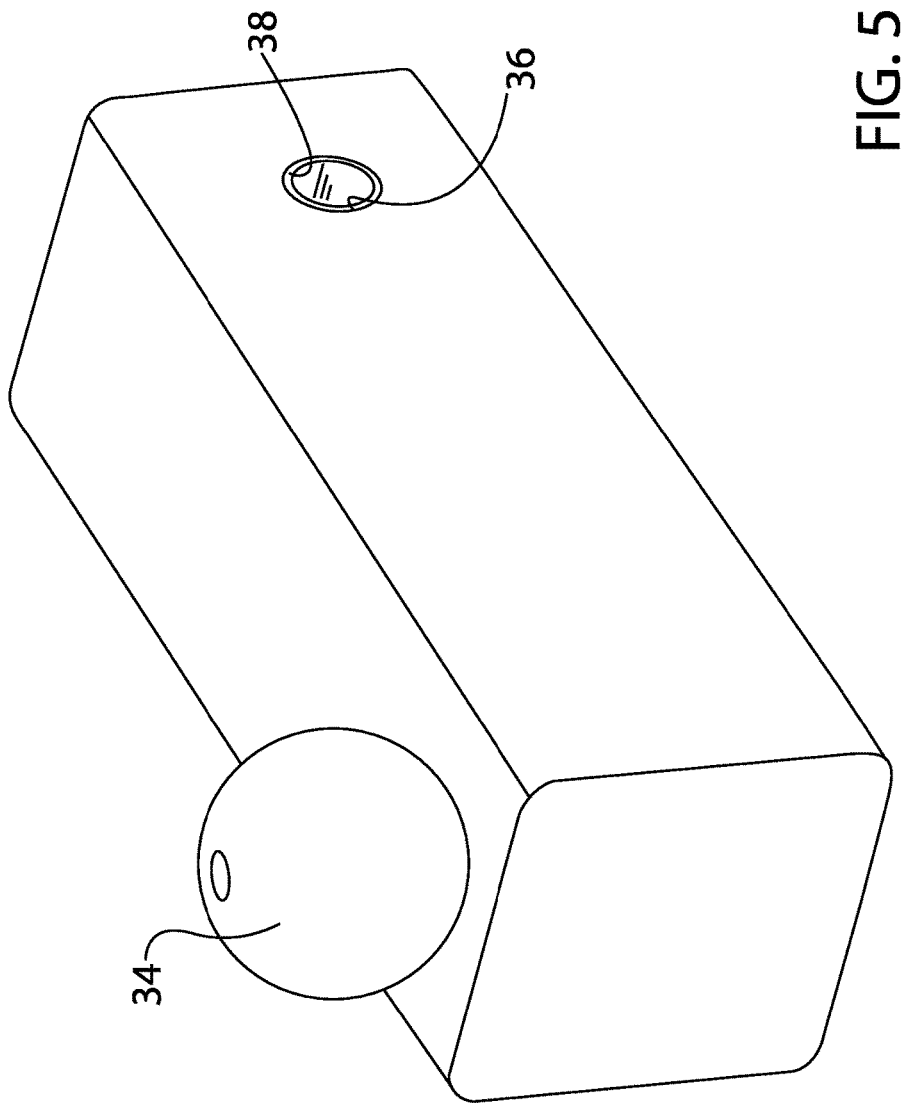
FIG. 5 is a perspective view of the drawbar-pin sleeve arrangement of the disclosed inventive concept illustrated in FIG. 4 but showing the pin sleeve having been fully inserted into the pin hole formed in the drawbar according to the disclosed inventive concept.
Figure 6:
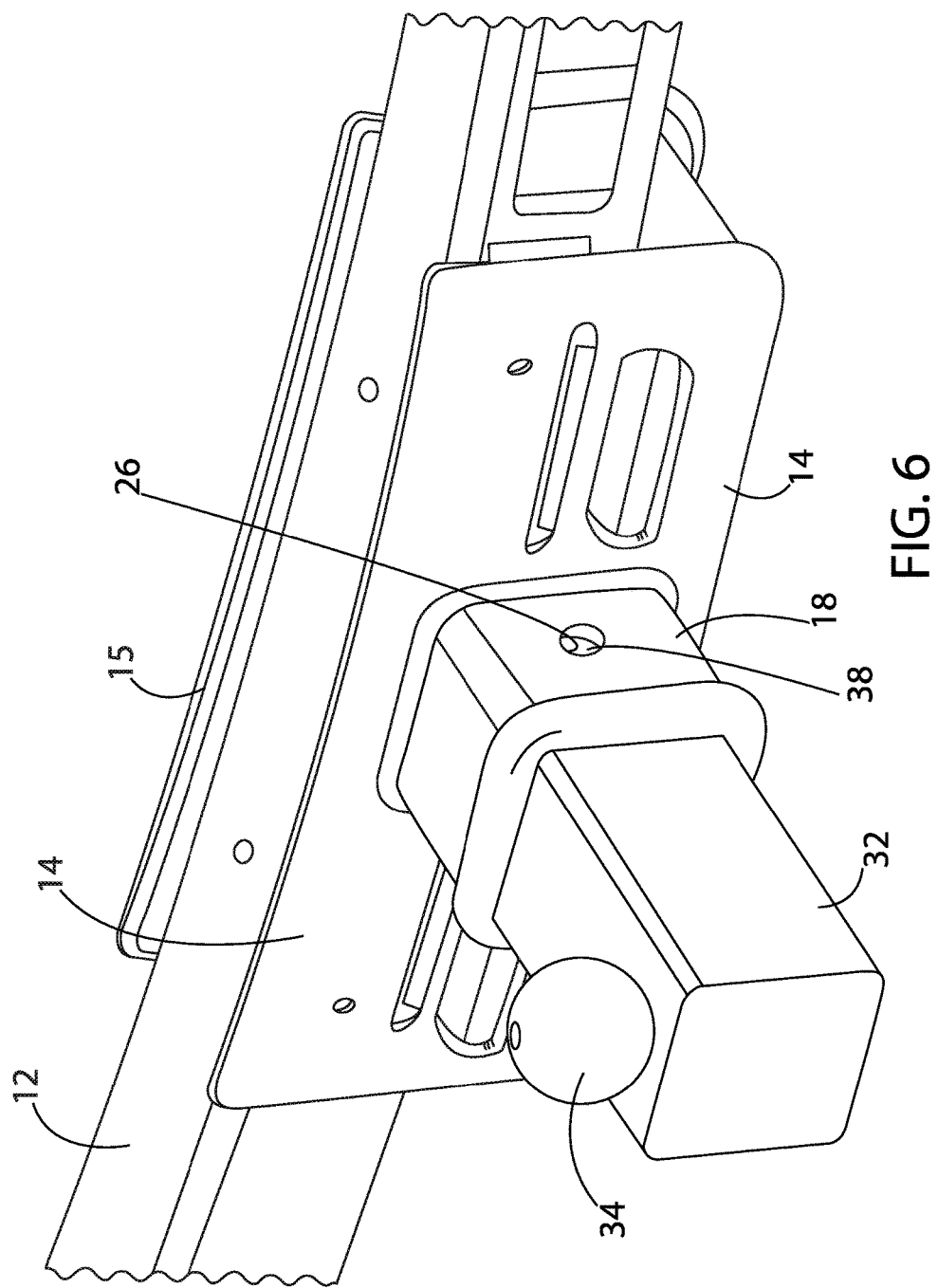
FIG. 6 is a perspective view of a trailer hitch architecture according to the disclosed inventive concept in which the drawbar-pin sleeve arrangement has been inserted into the standard hitch receiver according to the disclosed inventive concept.
Figure 7:
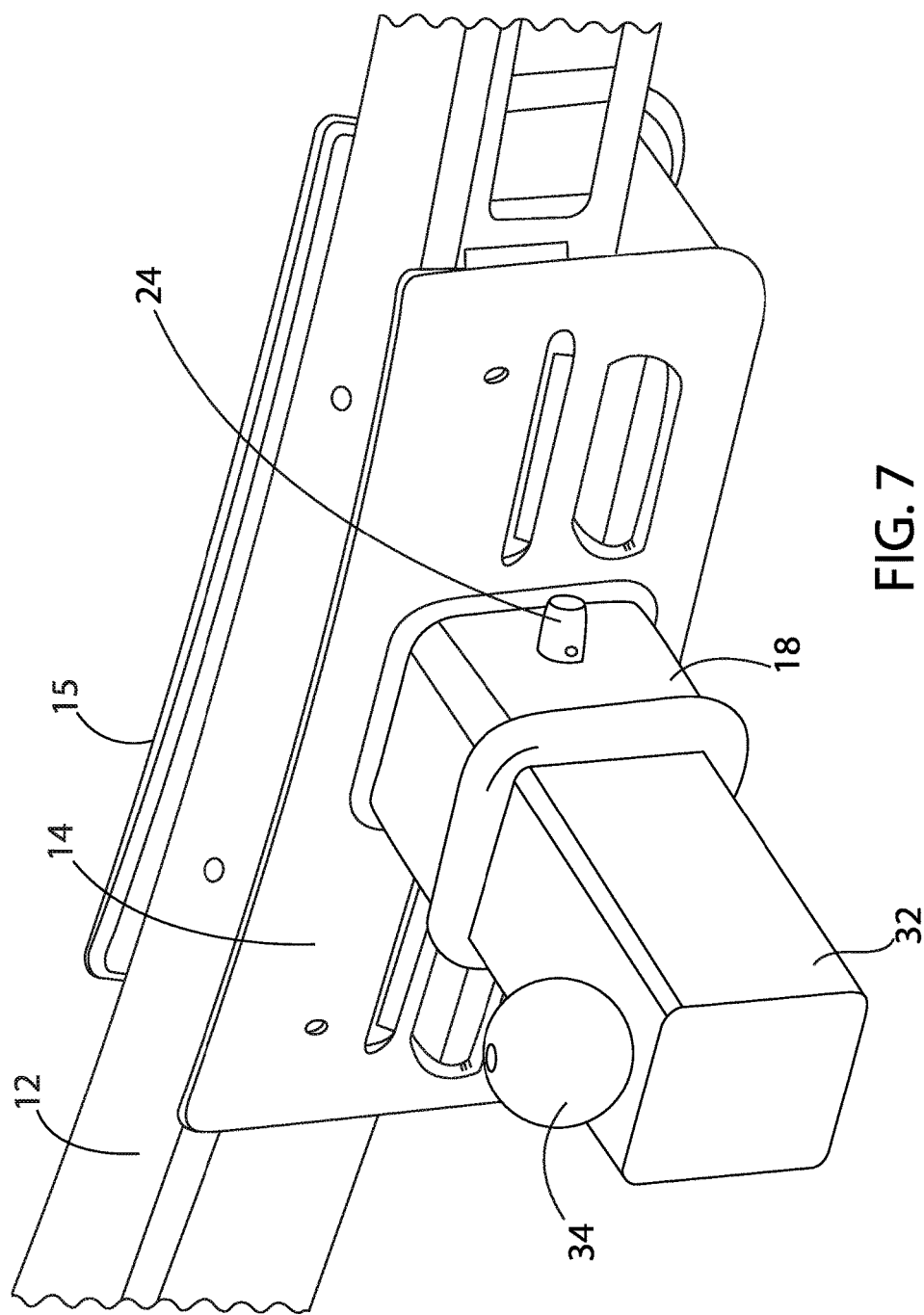
FIG. 7 is a view similar to that of FIG. 6 but illustrating a hitch pin inserted into the pin sleeve of the drawbar according to the disclosed inventive concept.
Figure 8:
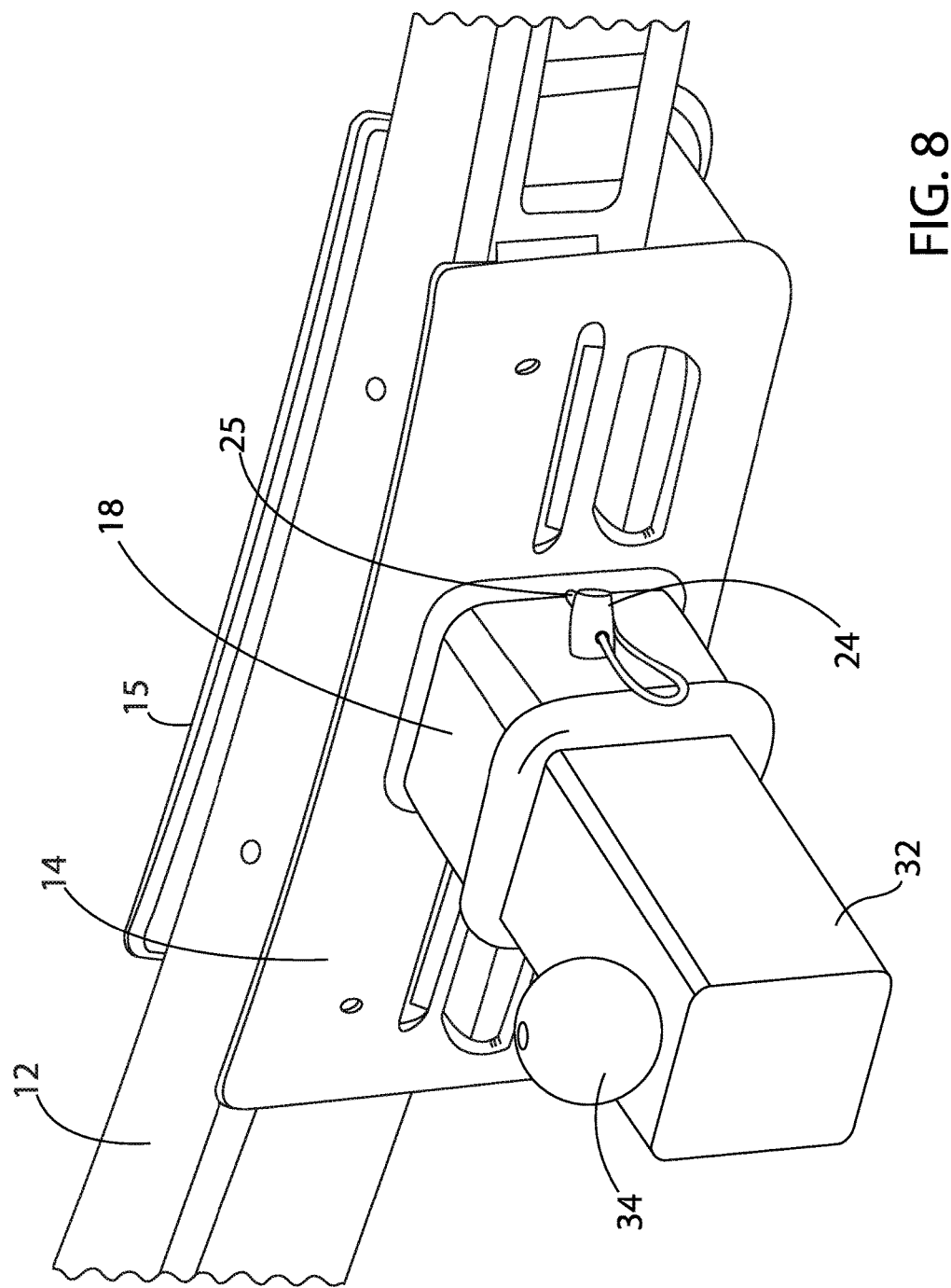
FIG. 8 is a view similar to that of FIG. 7 but illustrating a hitch pin clip inserted into the hitch pin according to the disclosed inventive concept.

Once the reducing pin sleeve 38 is positioned in the hitch pin hole 36 as shown in FIG. 5, the drawbar 32 is inserted to a desired depth into the base receiver 18 as illustrated in FIG. 6. As is known in use, the operator inserts the drawbar 32 into the base receiver 18 until the opening of the reducing pin sleeve 38 is in alignment with the 5/8" hitch pin hole 26. Once the preferred depth is achieved, the operator inserts the hitch pin 24 into the 5/8" hitch pin hole 26 and through the reducing pin sleeve 38 as illustrated in FIG. 7. Finally, the operator fits the hitch pin clip 25 to the hitch pin 24 as illustrated in FIG. 8 to lock the hitch pin 24 against accidental release.

Figure 9:
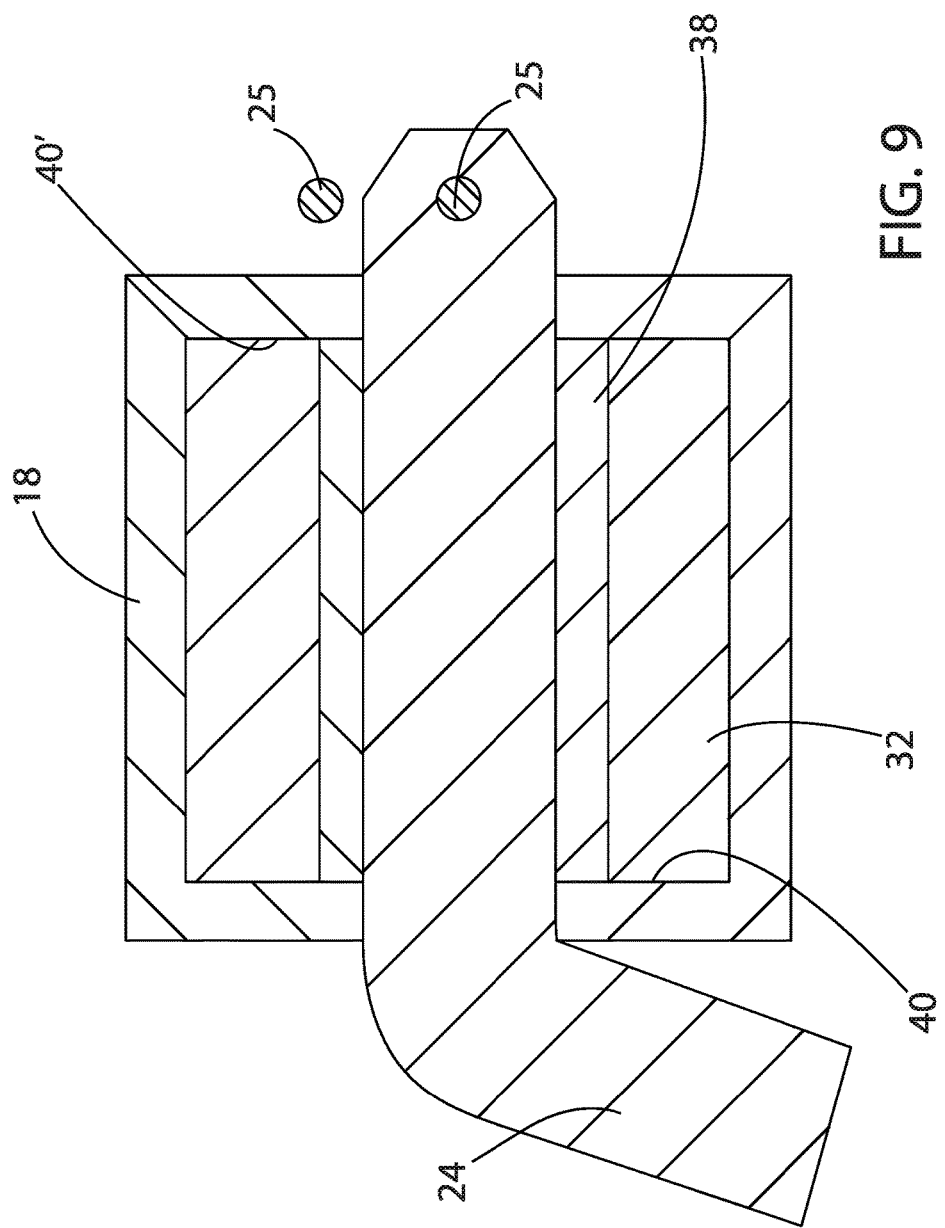
FIG. 9 is a sectional view of the drawbar having inserted therein a pin sleeve with the drawbar-pin sleeve arrangement inserted into the trailer hitch receiver and a hitch pin inserted to hold the drawbar-pin sleeve arrangement according to the disclosed inventive concept.

After the drawbar 32 is inserted into the base receiver 18, the reducing pin sleeve 38 is restricted from lateral movement. This arrangement is illustrated in FIG. 9 which illustrates a sectional view of the assembled trailer hitch according to the disclosed inventive concept. As illustrated in that figure, the base receiver 18 includes a pair of opposed inner walls 40 and 40'. The reducing pin sleeve 38 is captured between the opposed inner walls 40 and 40' which serve to restrict its lateral motion. The reducing pin sleeve 38 allows the operator to use a high strength hitch pin 24 having an outer diameter of 5/8" to hold the drawbar 32 in a fixed position relative to the base receiver 18.

The disclosed inventive concept as set forth above overcomes the challenges faced by known approaches to attaching a drawbar having a hitch pin hole of a first size to a hitch receiver having a hitch pin hole of a second size that is smaller than the hitch pin hole of the drawbar having a first size. The arrangement discussed above and set forth in FIGS. 4 through 9 is of relatively low cost to manufacture and thus helps to keep manufacturing expenses to a minimum. In addition, the reducing pin sleeve is easy to install and remove as desired, thus minimizing time required for switching from a drawbar having a hitch pin hole with a size too large for a the 5/8" hitch pin to one that is of the correct size. Finally, and perhaps most important, the arrangement presented herein provides a high degree of safety for the operator, the tow vehicle, and the trailer itself.

In addition, the disclosed inventive concept as set forth above is particularly suitable for use with heavy duty vehicles, such as larger farming or agricultural vehicles typically having a 3" draw bar. Importantly, the disclosed hitch architecture is easily adapted for a wide range of draw bar sizes that include the above-noted 2", 2.5" and 3" sizes as well as others known in the industry.

One skilled in the art will readily recognize from such discussion, and from the accompanying drawings and claims that various changes, modifications and variations can be made therein without departing from the true spirit and fair scope of the invention as defined by the following claims.

What is claimed is:

1. A trailer hitch assembly for a vehicle comprising:
   a receiver including a receiver pin-hole having a diameter;
   a drawbar insertable into said receiver, said drawbar including a drawbar pin-hole having a diameter;
   a sleeve having outer and inner diameters and insertable into said drawbar pin-hole, said diameter of said receiver pin-hole being equal to said inner diameter of said sleeve and smaller than said diameter of said drawbar pin-hole.

2. The trailer hitch assembly for a vehicle of claim 1, wherein said receiver includes a pair of opposed first and second inner walls and wherein said sleeve includes first and second ends, said first end of said sleeve being constrained from movement by said first inner wall of said receiver, and said second end of said sleeve being constrained from movement by said second inner wall of said receiver.

3. The trailer hitch assembly for a vehicle of claim 1, further including a hitch pin insertable into and through said receiver pin-hole and said sleeve.

4. The trailer hitch assembly for a vehicle of claim 3, wherein said receiver is a 3" receiver, said receiver pin-hole is a ⅝" hole, said drawbar pin-hole is a ¾" hole, said inner diameter of said sleeve is ⅝", said outer diameter of said sleeve is ¾", and said hitch pin is a ⅝" hitch pin.

5. The trailer hitch assembly for a vehicle of claim 3, wherein said hitch pin has an outer diameter, said outer diameter of said hitch pin being the same as said diameter of said receiver pin-hole and said inner diameter of said sleeve.

6. The trailer hitch assembly for a vehicle of claim 1, wherein said drawbar has a long axis and said drawbar pin-hole is formed through said drawbar transverse to said long axis of said drawbar, and further wherein said receiver has a long axis and said receiver pin-hole is formed through said receiver transverse to said long axis of said receiver.

7. The trailer hitch assembly for a vehicle of claim 1, wherein said inner diameter of said sleeve is coaxial with said drawbar pin-hole.

8. A trailer hitch assembly for a vehicle comprising:
   a receiver having opposed first and second walls and a receiver pin-hole having a diameter;
   a drawbar insertable into said receiver, said drawbar including a drawbar pin-hole having a diameter;
   a sleeve having inner and outer diameters, said sleeve being insertable into said drawbar pin-hole, said sleeve being constrained from lateral movement by being positioned entirely within said receiver and between said first and second walls,
   wherein said diameter of said receiver pin-hole is equal to said inner diameter of said sleeve and is smaller than said diameter of said drawbar pin-hole.

9. The trailer hitch assembly for a vehicle of claim 8, further including a hitch pin insertable into and through said receiver pin-hole and said sleeve.

10. The trailer hitch assembly for a vehicle of claim 9, wherein said receiver is a 3" receiver, said receiver pin-hole is a ⅝" hole, said drawbar pin-hole is a ¾" hole, said inner diameter of said sleeve is ⅝", said outer diameter of said sleeve is ¾", and said hitch pin is a ⅝" hitch pin.

11. The trailer hitch assembly for a vehicle of claim 9, wherein said hitch pin has an outer diameter, said outer diameter of said hitch pin being the same as said diameter of said receiver pin-hole and said inner diameter of said sleeve.

12. The trailer hitch assembly for a vehicle of claim 8, wherein said drawbar has a long axis and said drawbar pin-hole is formed through said drawbar transverse to said long axis of said drawbar, and further wherein said receiver has a long axis and said receiver pin-hole is formed through said receiver transverse to said long axis of said receiver.

13. The trailer hitch assembly for a vehicle of claim 8, wherein said inner diameter of said sleeve is coaxial with said drawbar pin-hole.

14. A method for attaching a drawbar to a receiver of a trailer hitch assembly, the method comprising:
   forming a receiver having opposed first and second walls;
   forming a drawbar insertable into said receiver, said drawbar including a drawbar pin-hole;
   forming a sleeve;
   forming a hitch pin;
   positioning said sleeve in said drawbar pin-hole to form a drawbar assembly;
   inserting said drawbar assembly into said receiver whereby said sleeve is constrained from lateral movement by being positioned entirely between said walls; and
   inserting said hitch pin into and through said receiver pin-hole and said sleeve.

15. The method for attaching a drawbar of claim 14, wherein said receiver includes a receiver pin-hole having a diameter and said sleeve has inner and outer diameters, said diameter of said receiver pin-hole being equal to said inner diameter of said sleeve and smaller than said diameter of said drawbar pin-hole.

16. The method for attaching a drawbar of claim 15, wherein said receiver is a 3" receiver, said receiver pin-hole is a ⅝" hole, said drawbar pin-hole is a ¾" hole, said inner diameter of said sleeve is ⅝", said outer diameter of said sleeve is ¾", and said hitch pin is a ⅝" hitch pin.

17. The method for attaching a drawbar of claim 15, wherein said hitch pin has an outer diameter, said outer diameter of said hitch pin being the same as said diameter of said receiver pin-hole and said inner diameter of said sleeve.

18. The method for attaching a drawbar of claim 15, wherein said drawbar has a long axis and said drawbar pin-hole is formed through said drawbar transverse to said long axis of said drawbar, and further wherein said receiver has a long axis and said receiver pin-hole is formed through said receiver transverse to said long axis of said receiver.

* * * * *